United States Patent
Pon et al.

(10) Patent No.: US 11,914,049 B2
(45) Date of Patent: Feb. 27, 2024

(54) METHODS AND APPARATUS FOR IMPROVING CARRIER PHASE DETECTION IN SATELLITE POSITIONING SYSTEM SIGNALS

(71) Applicant: QUALCOMM Incorporated, San Diego, CA (US)

(72) Inventors: Rayman Wai Pon, Cupertino, CA (US); Jordan Cookman, San Jose, CA (US); Gengsheng Zhang, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 17/167,952

(22) Filed: Feb. 4, 2021

(65) Prior Publication Data
US 2022/0244402 A1 Aug. 4, 2022

(51) Int. Cl.
*G01S 19/25* (2010.01)
*H04B 1/3827* (2015.01)

(52) U.S. Cl.
CPC .......... *G01S 19/256* (2013.01); *H04B 1/3827* (2013.01)

(58) Field of Classification Search
CPC ........ G01S 19/256; G01S 19/29; G01S 19/32; G01S 19/34; G01S 19/396; G01S 19/43; G01S 19/44; H04B 1/3827
See application file for complete search history.

(56) References Cited

U.S. PATENT DOCUMENTS

| | | | |
|---|---|---|---|
| 6,753,810 B1 * | 6/2004 | Yang | G01S 19/44 342/357.27 |
| 10,422,885 B2 * | 9/2019 | Dai | G01S 19/44 |
| 2003/0201933 A1 | 10/2003 | Cohen et al. | |
| 2004/0176102 A1 | 9/2004 | Lawrence et al. | |
| 2005/0203702 A1 * | 9/2005 | Sharpe | G01S 19/32 701/469 |
| 2007/0001899 A1 | 1/2007 | Lawrence et al. | |
| 2014/0062776 A1 * | 3/2014 | Ferguson | G01S 19/072 342/357.41 |

(Continued)

FOREIGN PATENT DOCUMENTS

CN          105301618 A  *  2/2016  ............. G01S 19/44

OTHER PUBLICATIONS

"GNSS Modulation Schemes—Navipedia.pdf" from https://gssc.esa.int/navipedia/index.php/GNSS_Modulation_Schemes (Year: 2011).*

(Continued)

*Primary Examiner* — Bernarr E Gregory
*Assistant Examiner* — Yonghong Li
(74) *Attorney, Agent, or Firm* — QUALCOMM Incorporated

(57) ABSTRACT

A mobile device may be configured to improve measurement of carrier phase (CP) in received satellite signals for satellite positioning system (SPS) operations. For example, this may enable an SPS receiver to measure CP of at least a first positioning signal and a second positioning signal each received from the same satellite vehicle. A corrected CP of the first positioning signal may be estimated based on the measured CP of the first positioning signal and on the measured CP of the second positioning signal.

27 Claims, 10 Drawing Sheets

(56) References Cited

U.S. PATENT DOCUMENTS

2020/0116869 A1    4/2020  Lennen
2021/0373178 A1*  12/2021  Chen ........................ G01S 19/43

OTHER PUBLICATIONS

"Infineon-AN575_BGA524N6_GNSS_LTE_B13-ApplicationNotes-v01_01-EN.pdf" from https://www.infineon.com/dgdl/Infineon-AN575_BGA524N6_GNSS_LTE_B13-ApplicationNotes-v01_01-EN.pdf?fileId=5546d4626cb27db2016cf6ecc1c87701 (Year: 2019).*
"CN105301618A_Description_20221117_0925.pdf" (translation of CN105301618A) (Year: 2016).*
International Search Report and Written Opinion—PCT/US2021/061031—ISA/EPO—dated Mar. 28, 2022.

* cited by examiner

METHODS AND APPARATUS FOR IMPROVING CARRIER PHASE DETECTION IN SATELLITE POSITIONING SYSTEM SIGNALS

BACKGROUND OF THE DISCLOSURE

1. Field of the Disclosure

Aspects of the disclosure relate generally to wireless communications and positioning.

2. Description of the Related Art

A receiver for Satellite Positioning Systems (SPS) and a transceiver for wireless communication systems are often embedded in a mobile device, such as a mobile phone, a wearable device, a laptop computer, an Internet of Thing (IoT) device, etc. SPS, for example, may include Global Navigation Satellite Systems (GNSS), such as Global Positioning System (GPS), while wireless communication systems include, e.g., terrestrial Wireless Wide Area Networks (WWAN), such as Long-Term Evolution (LTE) or Fifth Generation New Radio (5G NR), non-terrestrial WWANs, e.g., satellite communication systems, and Wireless Local Area Networks (WLAN), such as Wi-Fi. The SPS receiver may receive SPS signals from satellite vehicles and provide the SPS signals to a positioning operation. Estimating carrier phase (CP) of positioning signals received from satellite vehicles (SVs) may be an important part of such SPS operations. However, for a variety of reasons, such as cycle slips, interference caused by other signals, or power cycling of circuits in the mobile device for receiving the positioning signals, continuity of the CP estimation may be impaired. As such, there is need for improvement in the field of wireless communication devices to improve estimation of CP in positioning signals received from SVs.

SUMMARY

A mobile device may be configured to improve measurement of carrier phase (CP) in received satellite signals for satellite positioning system (SPS) operations. For example, this may enable an SPS receiver to measure CP of at least a first positioning signal and a second positioning signal each received from the same satellite vehicle. A corrected CP of the first positioning signal may be estimated based on the measured CP of the first positioning signal and on the measured CP of the second positioning signal.

In one implementation, a method for supporting satellite positioning system (SPS) operation performed by a mobile device, includes receiving a first positioning signal from a first satellite vehicle (SV), receiving a second positioning signal from the first SV, measuring a carrier phase (CP) of the first positioning signal at a first time and at a second time, measuring a CP of the second positioning signal at a third time and at a fourth time, and estimating a corrected CP of the first positioning signal at the second time based at least in part on a difference between the measured CP of the second positioning signal at the third time and the measured CP of the second positioning signal at the fourth time.

In one implementation, a mobile device configured to support satellite positioning system (SPS) operation, includes a satellite positioning system (SPS) receiver configured to receive SPS signals over a plurality of frequency bands, and a processor coupled to the SPS receiver and configured to: receive a first positioning signal from a first satellite vehicle (SV), receive a second positioning signal from the first SV, measure a carrier phase (CP) of the first positioning signal at a first time and at a second time, measure a CP of the second positioning signal at a third time and at a fourth time, and estimate a corrected CP of the first positioning signal at the second time based at least in part on a difference between the measured CP of the second positioning signal at the third time and the measured CP of the second positioning signal at the fourth time.

In one implementation, a mobile device configured to support satellite positioning system (SPS) operation, includes means for receiving a first positioning signal from a first satellite vehicle (SV), means for receiving a second positioning signal from the first SV, means for measuring a carrier phase (CP) of the first positioning signal at a first time and at a second time, means for measuring a CP of the second positioning signal at a third time and at a fourth time, and means for estimating a corrected CP of the first positioning signal at the second time based at least in part on a difference between the measured CP of the second positioning signal at the third time and the measured CP of the second positioning signal at the fourth time.

In one implementation, a non-transitory storage medium including program code stored thereon, the program code is operable to configure at least one processor in a mobile device to support satellite positioning system (SPS) operation, includes program code to receive a first positioning signal from a first satellite vehicle (SV), program code to receive a second positioning signal from the first SV, program code to measure a carrier phase (CP) of the first positioning signal at a first time and at a second time, program code to measure a CP of the second positioning signal at a third time and at a fourth time, and program code to estimate a corrected CP of the first positioning signal at the second time based at least in part on a difference between the measured CP of the second positioning signal at the third time and the measured CP of the second positioning signal at the fourth time.

BRIEF DESCRIPTION OF THE DRAWINGS

Aspects of the disclosure are illustrated by way of example. In the accompanying figures, like reference numbers indicate similar elements.

DETAILED DESCRIPTION

Figure 1:
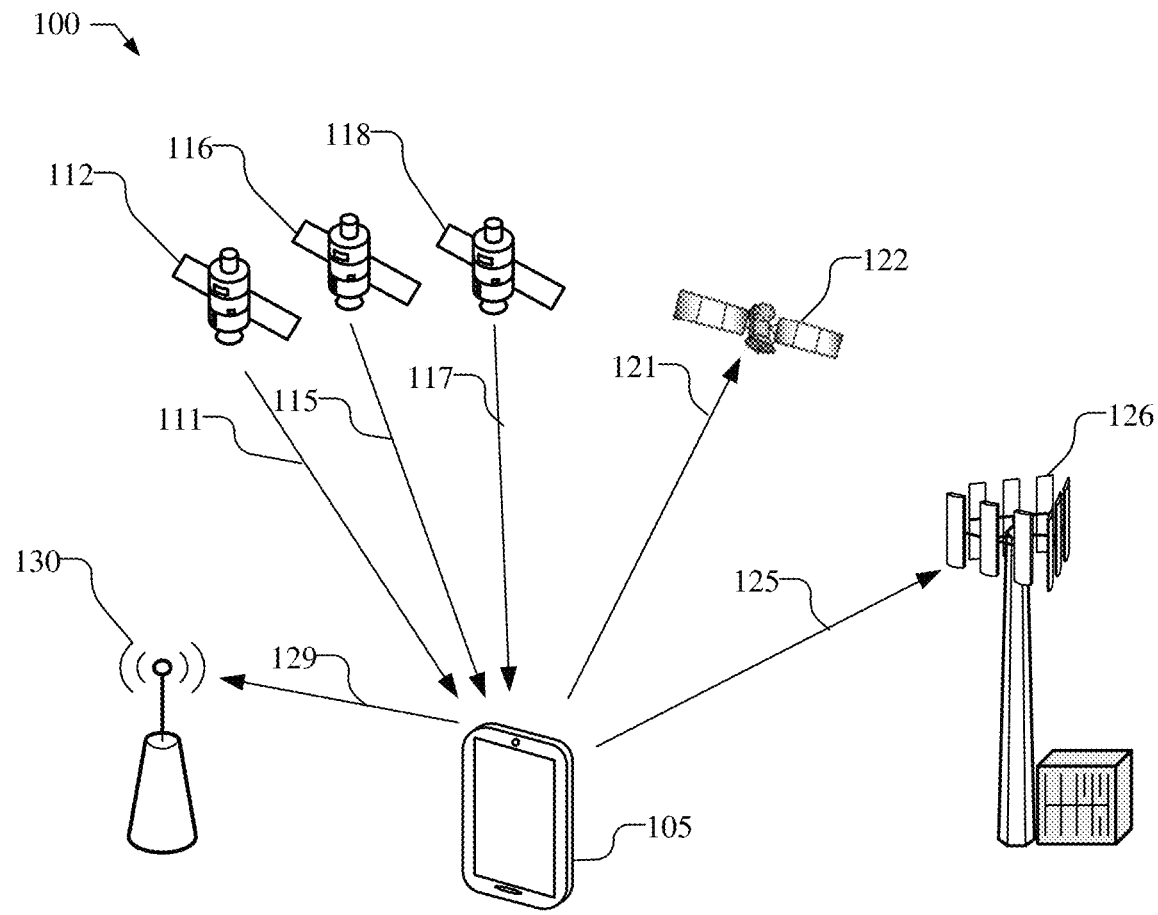
FIG. 1 illustrates a simplified diagram of a system in which a mobile device may receive SPS signals.

Several illustrative embodiments will now be described with respect to the accompanying drawings, which form a part hereof. While particular embodiments, in which one or more aspects of the disclosure may be implemented, are described below, other embodiments may be used, and various modifications may be made without departing from the scope of the disclosure or the spirit of the appended claims.

Satellite Positioning System (SPS) receivers and wireless transmitters, such as Wireless Wide Area Network (WWAN) and Wireless Local Area Network (WLAN) transmitters, are often embedded in a mobile device, such as a mobile phone, a wearable device, a laptop computer, an Internet of Thing (IoT) device, or a semiautonomous or autonomous vehicle, such as a ground vehicle, i.e., a self-driving car or truck, or an aerial vehicle, such as a unmanned aerial vehicle (UAV) sometimes referred to as a drone, etc. The SPS receiver may receive SPS signals from satellite vehicles and performs positioning operations based on the received SPS signals. The SPS receiver may support different global or regional positioning systems, such as Global Positioning System (GPS) signals, GLOobal NAvigation Satellite System (GLONASS) signals, Galileo (GAL) signals, BeiDou (BDS) signals, and/or signals of other type of satellite positioning system.

The wireless transmitter transmits and receives wireless signals for various communication operations, including data and control. A WWAN transmitter may support various communications systems including, for example, include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). Additionally, the WWAN transmitter may support non-terrestrial, e.g., satellite-based, communication systems. In some implementations, satellite-based communication systems may be combined with terrestrial wireless communications systems, such as 5G New Radio (NR) networks. In such a system, a mobile device may access a satellite, also referred to as a satellite vehicle (SV), instead of a terrestrial base station, which may connect to an earth station, also referred to as a ground station or non-terrestrial (NTN) gateway, which in turn may connect to a 5G network. A WLAN transmitter may support various communications systems including Wi-Fi, Long-Term Evolution (LTE) Direct, etc.

When supporting positioning operations, an SPS receiver may determine carrier phase (CP) of one or more positioning signals received from an SV in order to determine a position of the receiver. For example, such positioning signals may include one or more of a GPS L1 or L5 signal, a Galileo E1 or E5 signal, one or more BDS positioning signals, one or more QZSS positioning signals, and so on. However, determination of such CP may be impaired for a variety of reasons.

First, cycle slips may occur in the measurements of CP in the positioning signals. Cycle slips refer to discontinuities in the time series of CP measurements. These cycle slips may be due, for example, to the SPS receiver losing lock on the carrier of a positioning signal or may occur due to blockage of reception of the positioning signal at the mobile device. For example, the mobile device may be moved to a location where reception of the positioning signal is blocked, or during movement of the mobile device the line of sight between the mobile and the SV may be blocked momentarily. When a cycle slip is experienced, the loss of continuity of the CP measurement is undesirable, as the integer number of cycles elapsed since the cycle slip becomes unknown.

Additionally, a mobile device may engage in power management operations, and may periodically power down one or more receiver circuits for receiving the positioning signal. The mobile device therefore loses a lock on the positioning signal when the one or more receiver circuits are powered down. When those receiver circuits are powered back on, there may be undesirable delays in estimating the CP of the positioning signal.

The WWAN signals, particularly satellite based communication signals, or their harmonics, can be in or near the same frequency band as the SPS signals. Moreover, the satellite communication signals transmitted by the mobile device may be transmitted at significantly greater power than SPS signals, and thus may interfere with reception of the SPS signals, which can adversely affect the estimation of CP of one or more positioning signals by of the mobile device. This may adversely affect SPS operations, such as determination of position, velocity, time, or a combination thereof.

For example, two recently approved communications systems (Ligado and GlobalStar) use frequencies that are very near the Institute of Electrical and Electronics Engineers (IEEE) L1 band used for SPS, and in particular, the Glonass G1 satellite transmissions. These recently approved communications systems may interfere with reception of L1 positioning signals.

Many mobile devices are capable of receiving multiple positioning signals. For example, a mobile device may be capable of receiving both a GPS L1 signal and a GPS L5 signal, or both a Galileo E1 signal and a Galileo E5 signal, and so on. Often these signals may be received from the same SV. For example, an SV may transmit both a GPS L5 signal and a GPS L5 signal, which may be received at a mobile device.

Disclosed herein are techniques for improving reception and determination of carrier phase in SPS receivers capable of receiving multiple positioning signals from a single SV. Over short time periods, such as over a number of seconds, the carrier phase offset between two different positioning signals transmitted by a single SV may be nearly identical. For example, over a short time period the carrier phase offset between a GPS L5 signal and a GPS L5 signal transmitted by a single SV may be nearly identical. Similarly, because the antennas on the mobile device for receiving these positioning signals are collocated, the difference in CP of the two positioning signals measured at the mobile device may also be nearly identical over short time periods. Thus, when an interruption or interference occurs in reception of a first positioning signal but not a second positioning signal received from the same SV, the carrier phase from the second positioning signal may aid in accurate determination of the carrier phase in the first positioning signal.

FIG. 1 illustrates a simplified diagram of a system 100 in which the mobile device 105 may receive SPS signals. The SPS signals can be transmitted based on various satellite position signaling standards, such as a GPS, GLONASS, GAL, BDS, and/or other type of satellite positioning system. A mobile device 105 can include a satellite positioning system (SPS) receiver that may be compatible with one or more of these satellite position signaling standards. The SPS receiver may process the SPS signals on one or more frequency bands based on the signaling standards to extract information and perform a position calculation operation based on the extracted information. For example, as part of this processing, the SPS receiver may determine the CP of one or more received SPS signals.

Mobile device 105 may be a device designed to perform numerous functions, including the ability to determine its own position based on the reception of SPS signals from satellites. Mobile device 105 is able to perform satellite-based positioning by receiving SPS signals from one or more satellites. As shown here, mobile device 105 receives SPS signals 111, 115, and 117 from positioning satellites 112, 116, and 118, respectively. The SPS signals may be, e.g., any Global Navigation Satellite System (GNSS) such as GPS, GLONASS, GAL, or BeiDou or some other local or regional system such as Indian Regional Navigation Satellite System (IRNSS), Quasi-Zenith Satellite System (QZSS), European Geostationary Navigation Overlay Service (EGNOS) or Wide Area Augmentation System (WAAS).

Typically, each of the SPS signals 111, 115, and 117 would include timing information relating to when the SPS signal was transmitted from the respective satellite. Each SPS signal may also include ephemeris information which can be used to determine the position of the satellite at the time the SPS signal is transmitted. Mobile device 105 is able to determine when it receives each of the SPS signals 111, 115, and 117. The transmission time and reception time of each SPS signal may be aligned on a common timing reference, such as a common clock, known to the mobile device 105. By taking the difference between the reception time and transmission time, mobile device 105 may compute the flight time associated with each SPS signal, for it to travel from the respective satellite to mobile device 105. The flight time can then be used to compute the distance between each satellite and mobile device, taking into account the speed of light. Once the distance between each satellite and the mobile device is found, trilateration may be used to compute the position of mobile device 105, based on the known position of each satellite and the distance between each satellite and mobile device 105. SPS signals may be further used for determining the velocity of the mobile device 105 and may be further used for determination of absolute time.

In addition to satellite-based positioning, another category of functions that may be performed by mobile device 105 relates to wireless communications. Wireless communications may serve as an important link in connecting mobile device 105 over private and/or public networks with other devices such as servers and other mobile devices. This may include communication over various types of wireless networks, including wireless local area networks (WLAN) and wireless wide area networks (WWAN), among others. Examples of WLANs may be different types of Wi-Fi networks, such as those implemented based on various 802.11 standards. FIG. 1 illustrates wireless communications between the mobile device 105 and a terrestrial base station 126, a satellite vehicle 122, and an access point 130. However, other examples of wireless communications may include peer-to-peer communications between mobile devices such as Wi-Fi Direct, Long-Term Evolution (LTE) Direct, or Proximity-based Services (ProSe) Direction Communication (PC5), etc. Examples of WWAN may include satellite communications, 5G NR, LTE, wideband code division multiple access (WCDMA), and the like. Additional examples of wireless communications may include near field communications (NFC), Bluetooth communications, etc.

As used herein, the terms "mobile device" and "base station" are not intended to be specific or otherwise limited to any particular Radio Access Technology (RAT), unless otherwise noted. In general, a mobile device may be any wireless communication device (e.g., a mobile phone, router, tablet computer, laptop computer, tracking device, wearable (e.g., smartwatch, glasses, augmented reality (AR)/virtual reality (VR) headset, etc.), semi-autonomous or autonomous ground vehicle (e.g., automobile, truck, motorcycle, bicycle, etc.), semi-autonomous or autonomous aerial vehicle (e.g., UAV or drone), Internet of Things (IoT) device, etc.) used by a user to communicate over a wireless communications network. A mobile device may be mobile or may (e.g., at certain times) be stationary, and may communicate with a Radio Access Network (RAN). As used herein, the term "mobile device" may be referred to interchangeably as an "user equipment," "access terminal" or "AT," a "client device," a "wireless device," a "subscriber device," a "subscriber terminal," a "subscriber station," a "user terminal" or UT, a "mobile terminal," a "mobile station," or variations thereof. Generally, mobile devices can communicate with a core network via a RAN or in some cases a communication satellite, and through the core network the mobile devices can be connected with external networks such as the Internet and with other mobile devices. Of course, other mechanisms of connecting to the core network and/or the Internet are also possible for the mobile devices, such as over wired access networks, wireless local area network (WLAN) networks (e.g., based on IEEE 802.11, etc.) and so on.

As illustrated in FIG. 1, the mobile device 105 may support wireless communication using one or more Radio Access Technologies (RATs) such as using Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G New Radio (NR), etc. For instance, mobile device 105 may transmit communication signals 125 on a wireless communication link to a base station 126 and a communication signal 129 to an access point 130 on a wireless communication link. The base station 126, for example, may be part of a Radio Access Technology (RAT) and may support LTE or 5G NR communications, and access point 130 may support IEEE 802.11 WiFi. FIG. 1 highlights the wireless signals transmitted from mobile device 105 (as opposed to wireless signals received by mobile device 105), because various embodiments of the present invention addresses techniques to reduce interference caused by such transmitted signals, but it should be understood that communication signals may be both transmitted and received by the mobile device 105 via the wireless communication links.

The mobile device 105 may further or alternatively support wireless communications with a communication satellite 122. For example, the mobile device 105 may perform wireless communications by sending signals to and receiving signals from one or more communication satellites 122 via a wireless communication link. FIG. 1, by way of example, illustrates mobile device 105 transmitting a communication signal 121 on a wireless communication link to a communication satellite 122. It should be understood that the communication satellite 122 is separate from positioning satellites 112, 116, and 118 and is not part of the SPS. The communication satellite 122 may be part of a wireless communication network, such a 5G New Radio (NR) or some other wireless access type such as Code Division Multiple Access (CDMA). FIG. 1 highlights the wireless signal transmitted from mobile device 105 to the communication satellite 122 (as opposed to wireless signals received by mobile device 105), because various embodiments of the present invention addresses techniques to reduce interference caused by such transmitted signals, but it should be understood that communication signals may be both transmitted and received by the mobile device 105 via the wireless communication link 121.

The carrier frequency (or harmonics) for the transmitted communication signal 121 from the mobile device 105 may be in or near the SPS frequency bands used by SPS satellites 112, 116, and 118, and may be interfere with the reception of SPS signals. For example, the transmitted communication signal 121 from the mobile device 105 may interfere with SPS signals received in at least one frequency band received by the mobile device 105. Interference with frequencies within the SPS frequency bands may occur due to harmonics or intermodulation products of the carrier frequency of the transmitted wireless signal 121.

Figure 2:
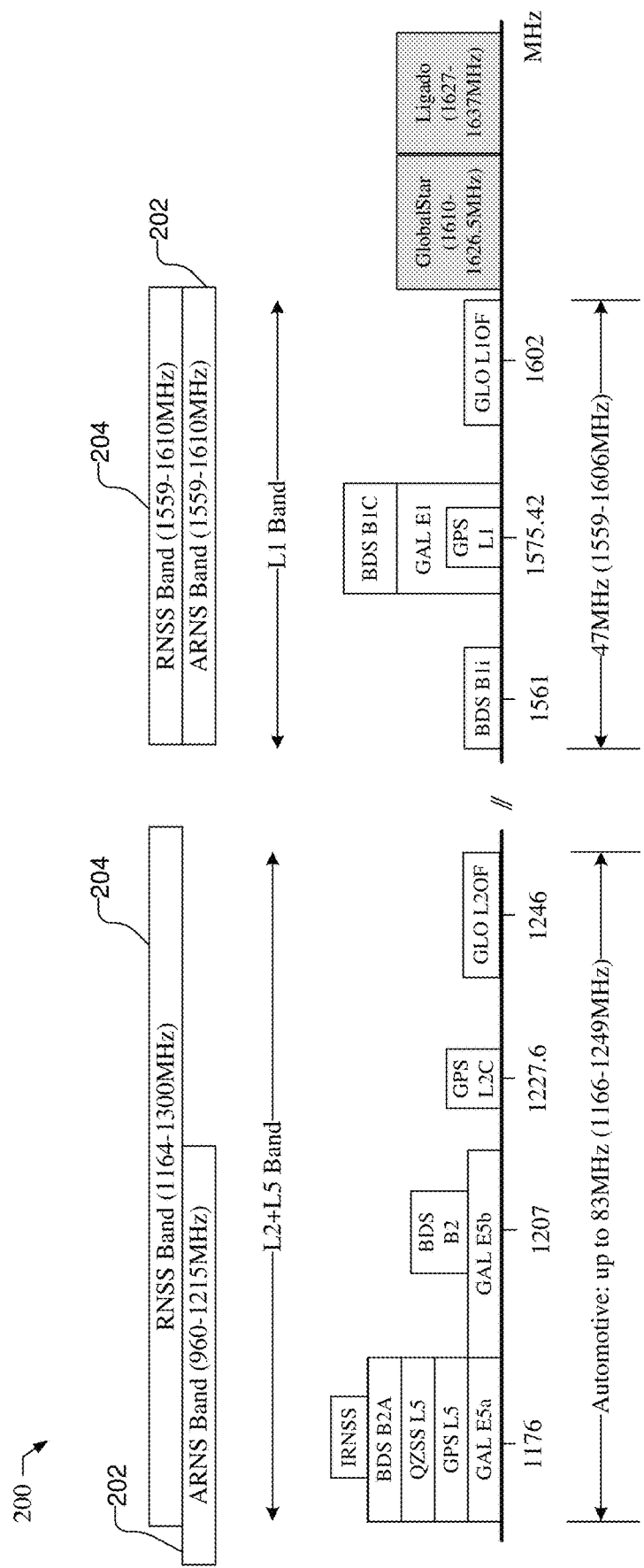
FIG. 2 illustrates examples of SPS signals and their frequency bands as well as carrier frequencies that may interfere with reception of SPS signals.

FIG. 2 illustrates examples of SPS signals 200 and their frequency bands as well as carrier frequencies that may interfere with reception of SPS signals. SPS operates on several frequencies in the L-Band as illustrated in FIG. 2. The L1 band covers 1159 MHz to 1606 Mhz and includes the L1 signals from GPS, Galileo, BeiDou, Glonass, and QZSS (not shown). These same constellations also transit simultaneously in other frequencies in the L2 and/or L5 band as shown in FIG. 2. In addition, there is an India regional system (NaVIC) which transmits in the L5 band. As shown by bands 202 of frequencies, there exists a protected region called the Aeronautical Radio Navigation System (ARNS) band whereby other signals are not permitted to be used, for communications or other purposes, to protect the Radio Navigation Signals from interference. Frequency bands 204 correspond to the Radio Navigation Satellite Service, where the SPS signals belong.

As shown in FIG. 2, a first set of SPS signals can occupy a frequency band of 1166-1249 MHz, which corresponds to the IEEE L2 band and L5 band. The first set of SPS signals may include, for example, IRNSS signal, BeiDou B2a signal (labelled "BDS B2a" and "BDS B2"), QZSS signal (labeled "QZSS L5"), Galileo E5a and E5b signals (labelled "GAL E5a" and "GAL E5b"), GPS L2 and L5 signals (labelled "GPS L2C" and "GPS L5"), and GLONASS signals (labelled "GLO L2OF", though sometimes also referred to as G2). Each of the first set of SPS signals includes a carrier of a pre-determined frequency. For example, IRNSS, BDS B2a, QZSS L5, GPS L5, and GAL E5a each has a carrier frequency of 1176 MHz, GAL E5b and BDS B2 has a carrier frequency of 1207 MHz, GPS L2C has a carrier frequency of 1227.6 MHz, whereas GLO L2OF or G2 has a carrier frequency of 1246 MHz.

Aa second set of SPS signals occupies a frequency band of 1559-1606 MHz, which corresponds to the IEEE L1 band. The second set of SPS signals may include, for example, BeiDou B1 signal (labelled "BDS B1i"), BeiDou B1C signal (labelled "BDS B1C"), Galileo E1 signal (labelled "GAL E1"), GPS L1 signal (labelled "GPS L1"), and GLONASS L1OF signal (labelled "GLO L1OF", though sometimes also referred to as G1). Each of the second set of SPS signals also includes a carrier of a pre-determined frequency. For example, BDS B1i has a carrier frequency of 1561 MHz, BDS B1C, GAL E1, and GPS L1 each has a carrier frequency of 1575.42 MHz, GLO L1OF or G1 has a central carrier frequency of 1602 MHz.

Usage outside of the ARNS bands 202 is permitted. Wireless communications, such as WWAN, WiFi, Bluetooth, for example, must reside outside of the ARNS band. Most communications frequencies are typically far enough away from the SPS signal bands L1 and L2+L5 to allow suppression of the communication signal with front end SAW (Surface Acoustic Wave) filters, to reduce and prevent interference and front end saturation into the SPS bands.

Two recently approved communications systems (Ligado and GlobalStar), however, use frequencies that are outside of the ARNS band 202, but are very close to the L1 band, as shown in FIG. 2. For example, Ligado frequencies are partly from 1627-1637 MHz and GlobalStar frequencies are from 1610 to 1626.5 MHz.

As discussed above, cycle slips may occur in the measurements of CP in the positioning signals, delaying and impairing accurate determination of CP in received satellite positioning signals. More particularly, such cycle slips may result in the CP of a positioning signal being ambiguously defined, as the number of cycles of the positioning signal occurring due to the cycle slip may be unknown. However, the example implementations recognize that over short time periods, such as over a number of seconds, the CP offset between two different positioning signals transmitted by a single SV may be nearly identical. Because mobile devices may often be capable of receiving multiple positioning signals from a single SV, such as receiving a GPS L1 and a GPS L5 signal from a single SV, when a cycle slip occurs for a first positioning signal but not a second positioning signal, the CP for the second positioning signal may be used to accurately estimate the CP in the first positioning signal.

Figure 3:
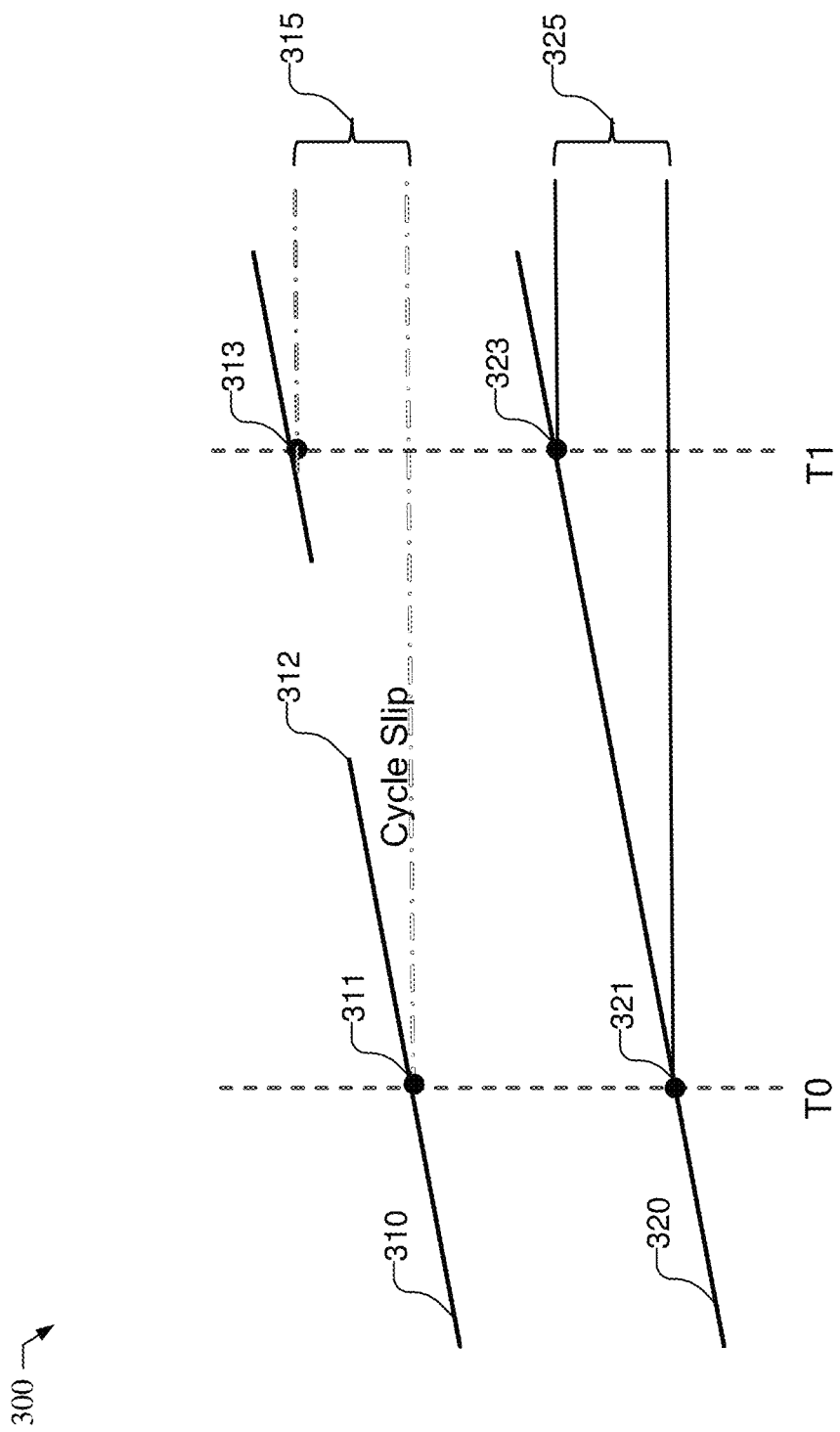
FIG. 3 shows an example graph of a CP estimation in a first positioning signal based on a measured CP of a second positioning signal, according to the example implementations.

FIG. 3 shows an example graph 300 of a CP estimation in a first positioning signal based on a measured CP of a second positioning signal, according to the example implementations. With respect to FIG. 3, a first positioning signal received by a mobile device 105 from an SV 112 may have a first CP 310, while a second positioning signal received by the mobile device 105 from the SV 112 may have a second CP 320. For example, the first positioning signal and second positioning signal may be a GPS L1 and L5 signal, or vice versa, a Galileo E1 and E5 signal, or vice versa, and so on. The mobile device may periodically measure CP for each of the first positioning signal and the second positioning signal, for example two subsequent measurements of CP for the positioning signals may be T0 and T1, as shown in FIG. 3. At T0, the first CP 310 may have a first value 311, and the second CP 320 may have a second value 321. However, between time T0 and timeT1, a cycle slip 312 may occur in reception of the first positioning signal. Subsequently, at timeT1, the first CP 310 is measured to have a third value 313, and the second CP 320 is measured to have a fourth value 323.

Because of the cycle slip 312, the third value 313 may not be accurate. More particularly, while the fractional portion of the third value 313 may be accurate—that is, the fractional number of cycles of the first positioning signal occurring between the first value 311 and the third value 313—the cycle slip means that the SPS receiver does not know the integer number of cycles of the first positioning signal occurring between the first value 311 and the third value 313. However, as discussed above, over short time periods the CP offset between the first positioning signal and the second positioning signal may be nearly identical. Therefore, the example implementations allow the CP measurements from the second positioning signal to aid in reconstruction of the CP for the first positioning signal after the cycle slip—at timeT1. Thus, a CP difference 325 in the second CP 320 between the second value 321 and the fourth value 323—which may also be called a delta CP—is nearly identical to a delta CP 315 between the first value 311 and the third value 313. A corrected third value of the first CP 310 may be determined based on the measured third value 313 of the first CP 310 and on a delta CP between the second value 321 and the fourth value 323 of the second CP 320. More particularly, the corrected third value may include the fractional portion of the measured third value 313 and an integer value based on the first value 311 added to the delta CP between the second value 321 and the fourth value 323. Note that this difference between the second value 321 and the fourth value 323 may be expressed as a number of cycles of the second positioning signal. This number of cycles of the second positioning signal may be converted to a length or distance based on the carrier wavelength of the second positioning signal, and then subsequently converted to a corresponding number of cycles of the first positioning signal based on the carrier wavelength of the first positioning signal. This corresponding number of cycles may then be used for generating the corrected third value.

Figure 4:
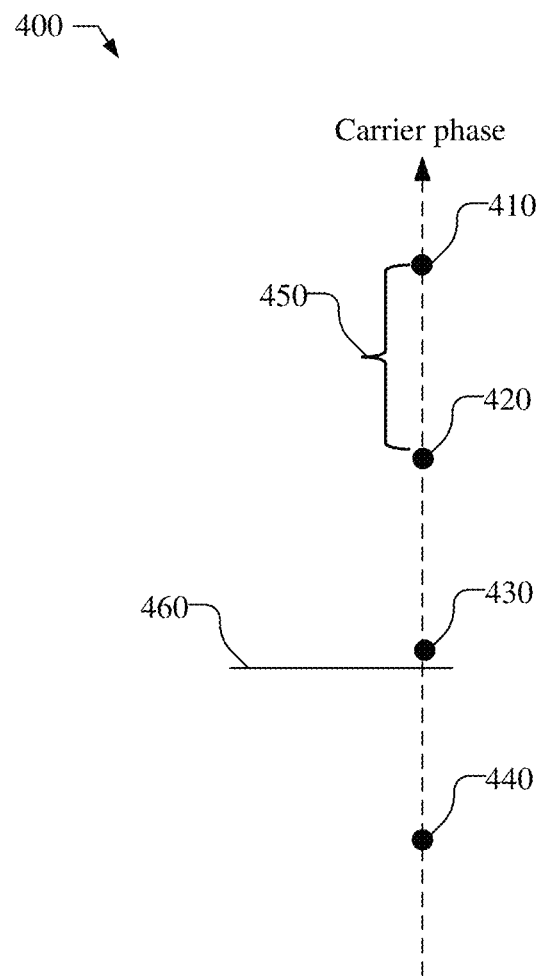
FIG. 4 shows an example graph illustrating the determination of the corrected third value of the first CP from FIG. 1, according to the example implementations.

FIG. 4 shows an example graph 400 illustrating the determination of the corrected third value of the first CP 310 from FIG. 1, according to the example implementations. As discussed above with respect to FIG. 3, while the fractional portion of the third value 313 may be accurate—that is, the absolute fractional carrier phase of the first positioning signal of the third value 313—the cycle slip means that the SPS receiver does not know the integer number of cycles of the first positioning signal occurring between the first value 311 and the third value 313. Thus, when the third value 313 of the first CP 310 is measured, only the fractional portion is valid, and the integer portion is unknown, or more precisely the integer portion is ambiguous, as it may take any of a number of differing values, each having the fractional carrier phase of the third value 313. Thus, for example, measuring the third value 313 after the cycle slip 312 constrains the actual CP of the first positioning signal at time T1 to be one of a number of possible values, each having the measured fractional value, and separated by one wavelength. Thus, the actual value of the CP of the first positioning signal may be one of the candidate values 410, 420, 430, 440, etc. shown in FIG. 4, where each of candidate values 410-440 has a fractional value equal to the fractional value of the measured third value 313 and is each separated from the others by an integer number of wavelengths of the first positioning signal. For example, candidate values 410 and 420 are separated by a single wavelength 450 of the first positioning signal. Determining the corrected third value may be based on the difference in the number of wavelengths of the second positioning signal between the second value 321 and the fourth value 323. This number of wavelengths difference from the second positioning signal, added to the first value 311, may correspond to predicted CP 460 of the corrected third value when expressed in wavelengths of the first positioning signal. This predicted CP 460 may be closest to candidate value 430, and thus generating the corrected third value may correspond to selecting the fractional portion of the measured third value 313 and selecting the candidate value closest to the integer portion 460.

Note that in some aspects, for accurate reconstruction of the third value 313, the candidate value chosen may be required to be within a threshold proportion of the wavelength of the predicted CP 460. For example, in some aspects, this threshold proportion may be one quarter wavelength for the corrected third value to be reconstructed with confidence. In some other aspects, this threshold proportion may be determined dynamically based at least in part on a signal strength of one or more of the received positioning signals, one or more signal to noise ratios of one or more of the received positioning signals, or other factors.

In some aspects, this threshold proportion may be one half wavelength. For example, as discussed further below, half-cycle ambiguities (HCAs) may occur when tracking CP of positioning signals. When no HCAs are present, or when tracking positioning signals for which HCAs are not a concern, then the candidate value may be confidently chosen when it is within one half wavelength of the predicted CP 460.

In some aspects, generating the corrected third value may also include accounting for changes in the integer cycle boundary, for example, when the predicted CP 460 is just under an integer number of cycles, and the candidate value 430 is just over an integer number of cycles.

The cycle slip mending process described above with respect to FIGS. 3-4 may be used for mending cycle slips in a GPS L1 signal using CP measurements of a GPS L5 signal, mending cycle slips in a GPS L5 signal using CP measurements of a GPS L1 signal, mending cycle slips in a Galileo E1 signal using CP measurements of a Galileo E5 signal, mending cycle slips in a Galileo E5 signal using CP measurements of a Galileo E1, signal, and similarly for received GLO, BDS and QZSS positioning signals, as well as for additional frequencies which may be transmitted by GPS and Galileo SVs, and GLO, BDS, and QZSS SVs. For example, the cycle slip mending process may be used for mending cycle slips in a GPA L1 signal using CP measurements of a GPS L2 or GPS L2C or GPS L1C signal.

In further aspects of the example implementations, a half-cycle ambiguity (HCA) in CP measurements of a data-modulated GNSS signal received from a first SV may be resolved using CP measurements for a second GNSS signal received from the first SV. More particularly, after an SPS receiver experiences a loss of lock on a data-modulated GNSS signal, an HCA may result. A subsequently measured CP for the data-modulated GNSS signal may be accurate, or half a wavelength off. Depending on the algorithms used by the SPS receiver, the CP of the GPS L1 signal may not be usable for a time, for example it may take seconds to resolve the HCA. The example implementations may allow the HCA to be resolved much more quickly. The HCA may be resolved similarly to the example shown in FIGS. 3-4. More particularly, a fractional portion of the CP of the GPS L1 signal may be determined, for example at a time T0 and a time T1. A delta CP for the GPS L5 signal between T0 and T1 may be determined. This difference may be converted from a number of wavelengths of L5 into a corresponding number of wavelengths of L1. Similar to FIG. 4, the fractional portion of the CP at T1 corresponds to a plurality of candidate values (e.g., candidate values 410-440), and these candidate values may be compared to the sum of the CP for L1 at T0 and the determined delta CP for L5. When experiencing an HCA, a candidate value will either be approximately half a wavelength from this sum—in which case the measured CP is off by half a wavelength—or will approximately line up with this sum, in which case the measured CP is accurate. Thus, the HCA may be quickly resolved.

In another example, the HCA may be resolved similarly to FIG. 4, except that the candidate values may be separated by half a wavelength. Thus, resolving the HCA may be performed by comparing the predicted CP at T1 to each of these half-wavelength candidate values. Selecting the closest candidate value thus resolves the HCA and ensures the chosen candidate value is within one quarter wavelength of the CP at T1. This may be combined with mending a cycle slip in some aspects, such that selecting the candidate value both resolves the HCA and determines the integer value of the mended CP at T1.

Note that the above described implementations for resolving HCAs are described with respect to a data-modulated GNSS signal. An example data-modulated signal may be a GPS L1 signal. In some other implementations, these techniques may be used for resolving HCAs in other positioning signals lacking a pilot carrier, for example in for some GLO or QZSS positioning signals. In some aspects, these techniques may be used for resolving HCAs in positioning signals having a tracker but for which a receiver only tracks a data channel—in other words, where a positioning signal has a pilot carrier, but where the receiver does not or cannot track that pilot. In other aspects, these techniques may be used for resolving HCAs in positioning signals where the receiver tracks both the data and pilot signals.

In further aspects of the example implementations, a mobile device may identify undetected cycle slips based on two or more positioning signals received from the same SV. For example, similarly to the example described above with respect to FIG. 3, a mobile device may receive two or more positioning signals from a single SV, however, no cycle slip may be detected for the first positioning signal between the first time and the second time. Provided that CP is valid and no HCA for the positioning signals at the beginning or end of a time period between TO and T1, a mobile device may identify undetected cycle slips based on an offset between CP difference 315 and CP difference 325. When there is a cycle slip in the first positioning signal, the integer portion of the third value 313 is incorrect by an integer number of cycles of the first positioning signal. Consequently, undetected cycle slips may be identified by determining that this offset approximately corresponds to an integer number of cycles of the first positioning signal. More particularly, the CP difference 315 may be expressed as a distance corresponding to cycles of the first positioning signal, and the CP difference 325 may be expressed as a distance corresponding to a cycles of the second positioning signal for determining this offset. Because determining that the offset corresponds to an integer number of cycles may be difficult to detect, in some aspects this offset may be compared to a first threshold distance, and if the offset exceeds the first threshold distance, an undetected cycle slip is identified. In one example, if the offset exceeds 13 cm, an undetected cycle slip may be identified.

In some aspects, mobile devices may also be capable of identifying undetected cycle slips in the presence of an HCA. However, a larger threshold distance may be required. That is, rather than comparing the offset to the first threshold distance, in the presence of a HCA, the offset may be compared to a second threshold distance greater than the first threshold distance to identify an undetected cycle slip.

When a mobile device only receives two positioning signals from the same SV, it may not be possible to determine whether the undetected cycle slip is on the first positioning signal or the second positioning signal. However, some mobile devices may be capable of receiving three or more positioning signals from the same SV. In such cases, it may be easier to determine which positioning signal has experienced the cycle slip. For example, if a mobile device receives first, second, and third positioning signals from the same SV, a first offset is determined for the first and second positioning signals, a second offset is determined for the second and third positioning signals, and a third offset is determined for the third and first positioning signals. Each of the first, second, and third offsets may then be compared with the first threshold. Because the likelihood of an undetected cycle slip occurring concurrently on two or more of the positioning signals, if two of the offsets exceed the first threshold, but the remaining offset does not, the positioning signal experiencing the cycle slip may be identified. For example, if the first and second offset exceed the first threshold and the third offset does not, then the undetected cycle slip may be identified as occurring on the second positioning signal.

In some aspects, an offline position engine may consume positioning signal inputs. For example, the offline positioning engine may consume these positioning signal inputs as a measurements file having a receiver independent exchange (RINEX) format, or another suitable format including the CP measurements and one or more loss of lock indicators (LLIs). Similarly to the examples described above, the offline position engine may mend detected cycle slips, resolve HCAs, and check for undetected cycle slips.

In one example, when mending cycle slips using an offline position engine, some cycle slips may be selectively left unmended. For example, when the fractional CP offset, that is, the difference between the closest candidate value (e.g., one of candidate values 410-440) and the predicted CP 460 is greater than the threshold proportion of the first positioning signal, then the cycle slip may be left unmended. This is because the resulting corrected value may have a low degree of confidence in such situations. For example, as described above, this threshold proportion may be one quarter cycle of the first positioning signal, one half cycle of the first positioning signal, or may be a dynamically determined threshold proportion.

In some aspects, the mobile device may have access to a greater number of CP observations for the first and second positioning signals than may be captured in the measurements file. For example, while a measurements file may include CP measurements at a rate of one or ten per second (1 Hz or 10 Hz), the software running on the mobile device may have access to CP measurements at a rate of 50 Hz or higher. In some aspects, the software may mend cycle slips at one or more of these additional CP measurements to improve the CP measurements to be included in the measurements file. For example, the additional CP measurements may be leveraged to avoid adding cycle slips to the measurements file which may be difficult to confidently mend. In some aspects, when a cycle slip is detected, based on CP measurements to be included in the measurements file, for which the difference between the closest candidate value and the predicted CP 460 is greater than one quarter cycle, the cycle slip may be mended based on the additional CP measurements of the software. For example, consider a measurement file including CP measurements at 10 Hz and software measuring CP in real time at 50 Hz. Five CP measurements are made within the mobile device for every one CP measurement included in the measurements file. Thus, as shown below, between CP measurements at T1 and T2 added to the measurements file (shown in bold), 4 CP measurements are made by the software in the mobile device, at times T1-2, T1-3, T1-4, and T1-5.

T1-T1-2-T1-3-T1-4-T1-5-T2

A cycle slip may occur at time T1-3. In one example, the difference between the closest candidate value and the predicted CP 460 may be compared to one quarter cycle of the first positioning signal. If the difference exceeds one quarter cycle, then the cycle slip may be difficult to confidently mend in the measurements file—that is, between times T1 and T2. In some aspects, the algorithm described above with respect to FIGS. 3-4 may be attempted for times T1 and T1-4, T1 and T1-5, T1-2 and T1-4, and so on, in order to identify a pair of times for which the difference does not exceed one quarter cycle. In response to identifying such a pair of times, the cycle slip may be mended, and the corrected CP included in the measurements file at time T2, thus improving the accuracy and continuity of CP recorded in the measurements file. In some aspects, after resolving such a cycle slip, the example implementations may examine the measurements at the pairs of times using the techniques described above with respect to undetected cycle slips. For example, this may identify occasions where noise or multipath caused a cycle slip to be falsely detected at time T1-3. For example, if the values at the other pairs of time are accurate, then mending the cycle slip may be unnecessary, and the CP values added to the measurements file may be accurate without requiring mending.

As discussed above, mobile devices may engage in power management operations, and may place circuits for receiving one or more of the positioning signals in a low power or powered down state. For example, mobile devices may engage in time domain multiplexing (TDM) of circuits for receiving different positioning signals in order to conserve power. When those circuits are powered back up, it may be unknown how many cycles of a positioning signal have elapsed, which may impair CP determinations. However, the example implementations allow for CP measurements for a second positioning signal to aid in generating accurate CP measurements for a first positioning signal when such power management operations are used. For example, the portion of the duty cycle during which a circuit for receiving a first positioning signal is powered down may be considered as similar to a cycle slip.

Figure 5:
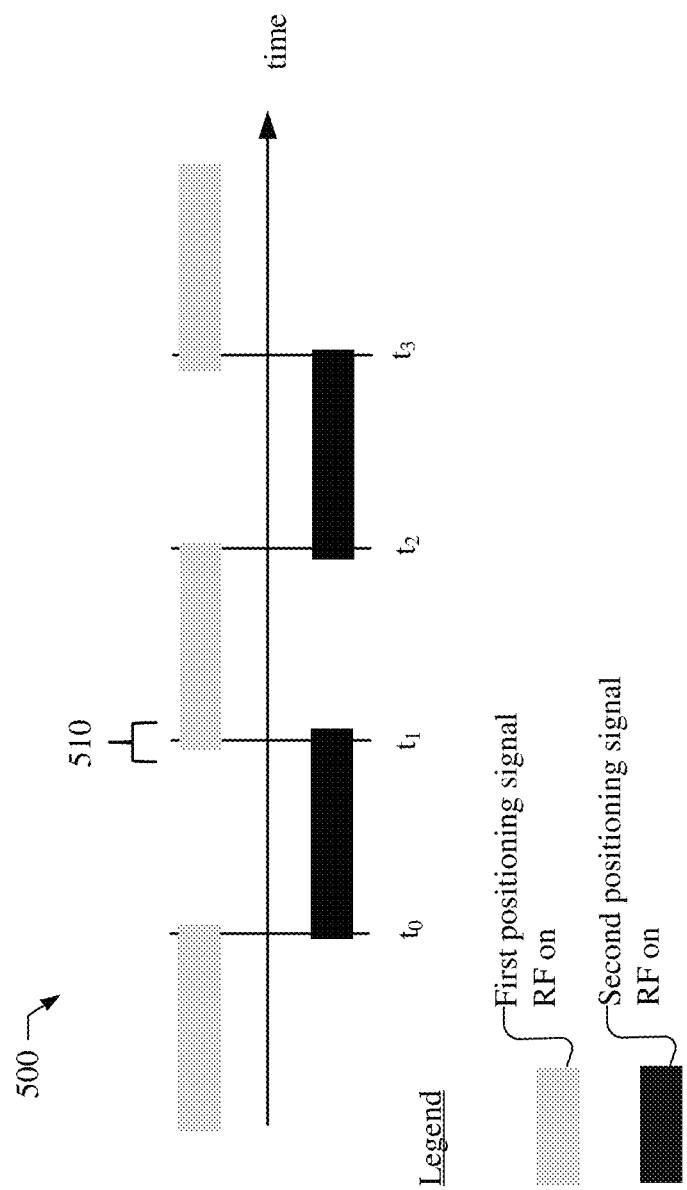
FIG. 5 shows a representation showing time domain duty cycles of circuitry for receiving a first positioning signal and a second positioning signal, according to some implementations.

FIG. 5 shows a representation 500 showing time domain duty cycles of circuitry for receiving a first positioning signal and a second positioning signal, according to some implementations. Similar to the examples discussed with FIGS. 3-4, the first positioning signal and second positioning signal may be GPS L1 and L5, or vice versa, Galileo E1 and E5, or vice versa, or similar BDS or QZSS signals. As shown in FIG. 5, RF and other circuitry for receiving and processing a first positioning signal and a second positioning signal—the respective "first positioning signal RF" and "second positioning signal RF" may be periodically cycled from a full-power state to a lower-power state, such as a low-power sleep state, or a powered down state, and so on.

Thus, FIG. 5 shows time periods when the first and second positioning signal RF are on. As shown in FIG. 5, these time periods overlap, for example, during an overlapping period 510 the first and second positioning signal RF are both on. Thus, when the first positioning signal RF comes on just prior to t1, the measured CP for the second positioning signal may be used to aid in fast and accurate determination of the CP for the first positioning signal. More particularly, the fractional portion of the measured CP for the first positioning signal may be retained, and the integer portion of the CP may be determined based on a delta CP for the second positioning signal, similarly to the example discussed with respect to FIGS. 3-4. For example, between to and t1, the second positioning signal may be used to aid in ensuring continuity of the CP of the first positioning signal—correcting the ambiguity in cycle count caused by the first positioning signal RF not being on. Subsequently, between $t_1$ and $t_2$, the first positioning signal may be used to aid in ensuring continuity of the CP of the second positioning signal, and so on.

Figure 6:
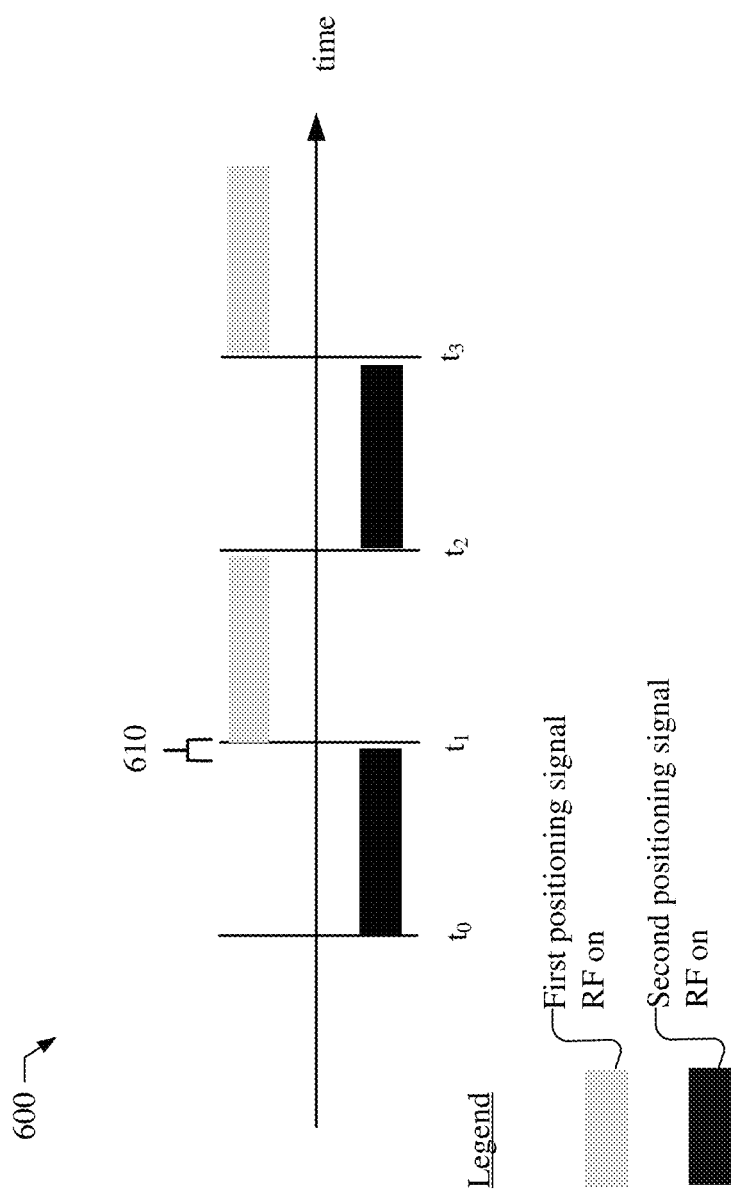
FIG. 6 shows a representation showing time domain duty cycles of circuitry for receiving a first positioning signal and a second positioning signal, according to some implementations.

While FIG. 5 shows the duty cycles of the first positioning signal RF and second positioning signal RF overlapping, in some examples the duty cycles may not overlap. For example, when a mobile device uses a receiver with a single RF path to receive both the first positioning signal and the second positioning signal, the mobile device may periodically switch between receiving the first positioning signal and receiving the second positioning signal. FIG. 6 shows a representation 600 showing time domain duty cycles of circuitry for receiving a first positioning signal and a second positioning signal, according to some implementations. Similar to the examples discussed with FIGS. 3-4, the first positioning signal and second positioning signal may be GPS L1 and L5, or vice versa, Galileo E1 and E5, or vice versa, or similar BDS or QZSS signals. Contrary to the example of FIG. 5, in FIG. 6 there are gaps between the duty cycles of the first positioning signal RF and second positioning signal RF. These gaps, where neither the first positioning signal RF nor the second positioning signal RF are on, may result in error when using the delta CP for the second positioning signal to aid determination the CP of the first positioning signal, and vice versa. In some aspects, a projection of the CP of the second positioning signal over the time gap 610 may be used to aid determination of the CP for the first positioning signal. That is, the delta CP for the second positioning signal may be projected over the time gap 610 in order to determine the integer portion of the CP of the first positioning signal. The error introduced by such projection may depend on acceleration and dynamics of the mobile device, and thus if the mobile device is not undergoing significant acceleration or dynamics, then the CP for the first positioning signal may be accurately determined. In some aspects, this projection may be linear, while in some other aspects it may be polynomial, such as quadratic. For example, if the time gap is 40 milliseconds, the slope of the CP of the second positioning signal over the previous 20 or more milliseconds may be used to linearly project over the time gap, and if the mobile device is accelerating at a constant 1 g, then the error introduced by the acceleration will be less than 1 centimeter, which is only a small fraction of a wavelength of typical positioning signals.

Figure 7:
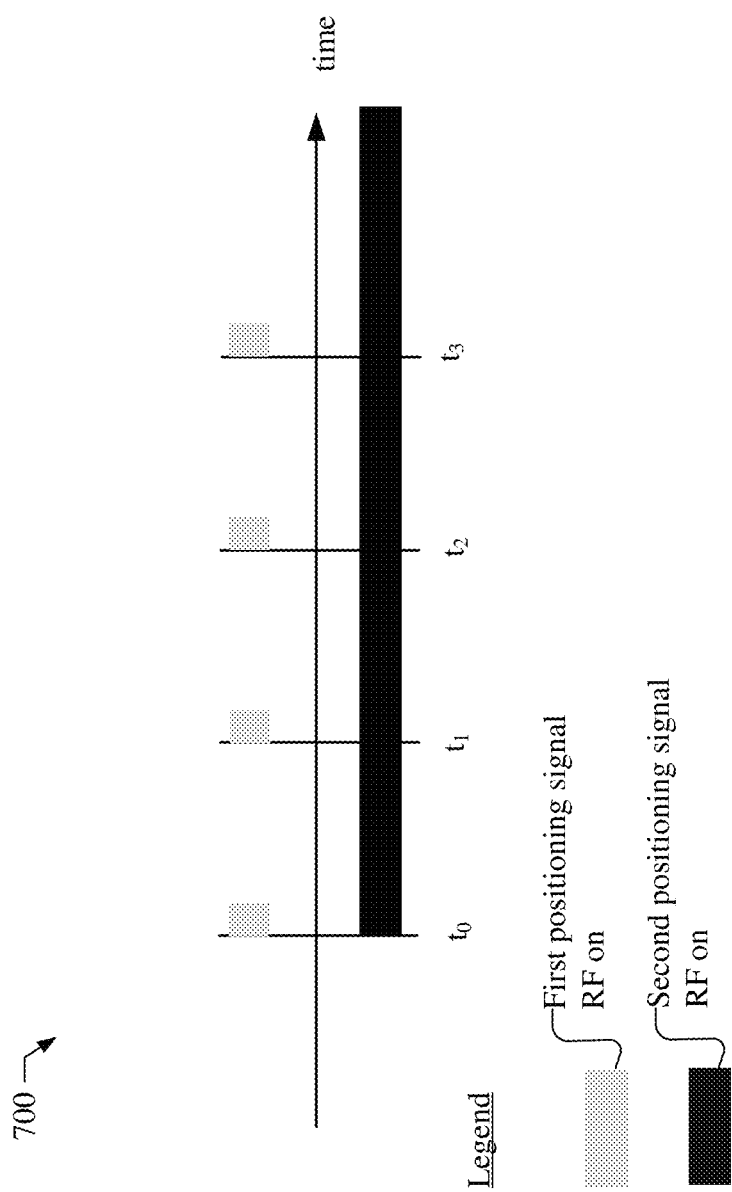
FIG. 7 shows a representation showing time domain duty cycles of circuitry for receiving a first positioning signal and a second positioning signal, according to some implementations.

In some aspects, a mobile device may operate first positioning signal RF (and other circuitry) on a very small duty cycle, while keeping second positioning signal RF (and other circuitry) constantly on. For example, a mobile device may constantly power circuitry for receiving a GPS L5 signal, but only occasionally power circuitry for receiving a GPS L1 signal. FIG. 7 shows a representation 700 showing time domain duty cycles of circuitry for receiving a first positioning signal and a second positioning signal, according to some implementations. As shown with respect to FIG. 7, while the second positioning signal RF is constantly powered on, the first positioning signal RF is powered only at a small duty cycle. Using the techniques described above with respect to FIGS. 3-5, delta CP measurements from the second positioning signal may be used to aid determination of CP for the first positioning signal when the first positioning signal RF powers on.

Figure 8:
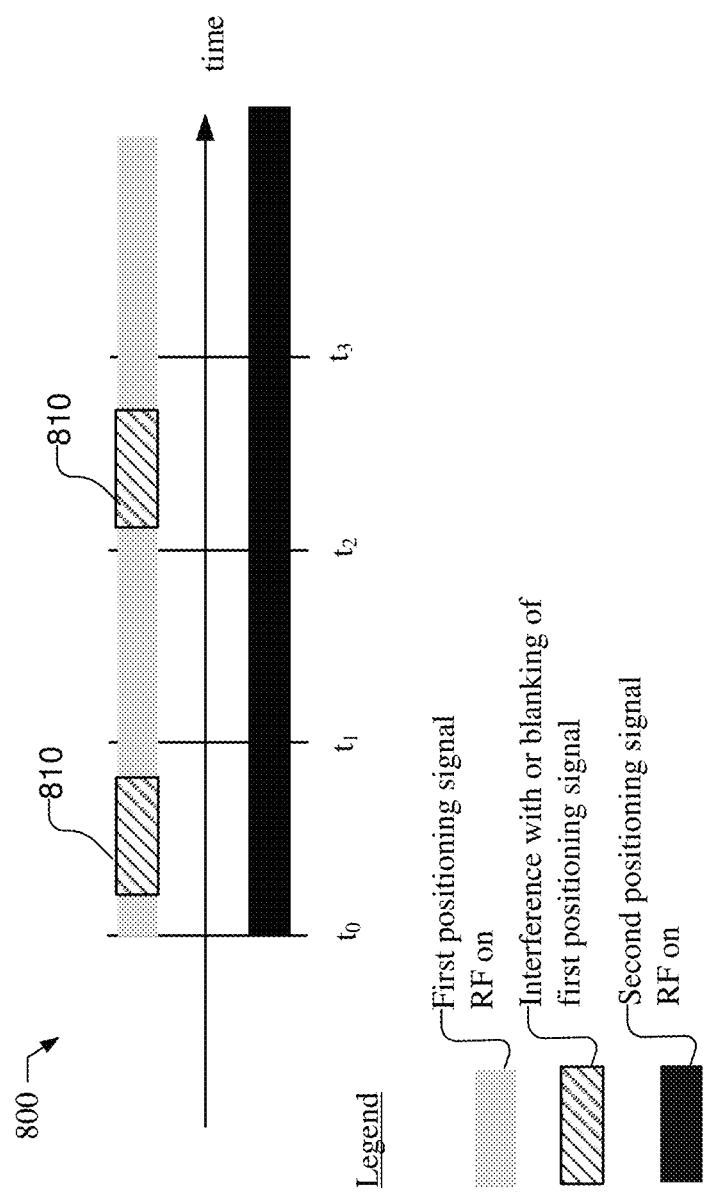
FIG. 8 shows a representation showing time domain duty cycles of circuitry for receiving a first positioning signal and a second positioning signal, in the presence of interference or blanking, according to some implementations.

FIG. 8 shows a representation 800 showing time domain duty cycles of circuitry for receiving a first positioning signal and a second positioning signal, in the presence of interference or blanking, according to some implementations. As discussed below, Ligado and GlobalStar transmissions may interfere with reception of GNSS L1 signals, and LTE transmissions on B13 or B14 bands may require blanking of Galileo E1 and/or BDS B1C signals. This may result in periods of time where CP may not be determined for a first positioning signal, shown as time periods 810 in FIG. 8. Using techniques similar to those discussed above with respect to FIGS. 3-5, delta CP measurements for the second positioning signal may aid in recovery of CP for the first positioning signal after such interference or blanking has completed. More particularly, the interference or blanking may be considered analogous to a cycle slip between the measurements at times T0 and T1 with regard to FIGS. 3-4. Thus, the corrected CP for the first positioning signal after the interference or blanking is finished may include the fractional portion of the measured CP for the first positioning signal and an integer portion corresponding to a sum of a most recent valid CP of the first positioning signal (i.e., prior to interference) and the delta CP for the second positioning signal.

When a mobile device 105 is transmitting in the Ligado or GlobalStar frequencies, the L1 SPS receiver may blank or disable its input to avoid saturating or even damaging the sensitive SPS L1 front end. However, even during Ligado communications, time remains to acquire and track the L1 signals. For example, the Ligado transmission by the mobile device 105 may at most be ON for 2.0 out of every 2.5 seconds. This allows 20% window to acquire and track the GPS L1 signals. Accordingly, during Ligado or GlobalStar transmission by the mobile device 105, the L1 SPS receiver may essentially disable all L1 SPS signals, including the GPS, QZSS, GAL, BDS, and GLO. This results in cycle slips for L1, and inability to determine CP for L1 during such transmissions. However, example implementations may be used for recovering CP for L1 during gaps in the Ligado or GlobalStar transmissions.

Further, transmissions over the LTE B13 and B14 bands may interfere with Galileo and/or BDS signal reception, when a mobile device has insufficient WWAN antenna to GNSS antenna isolation. In such examples, a receiver may blank Galileo E1 and BDS B1C signals in order to avoid reporting bad GNSS data. This may also result in loss of carrier phase and cycle slips in the E1 and B1C signals. The example implementations may be used to recover CP for the blanked GNSS signals after B13 or B14 transmissions have ceased. More particularly, delta CP for the Galileo E5 signal may be used for recovering CP for the blanked Galileo E1 signal, and delta CP for the BDS B2A signal may be used for recovering CP for the blanked BDS B1C signal.

Figure 9:
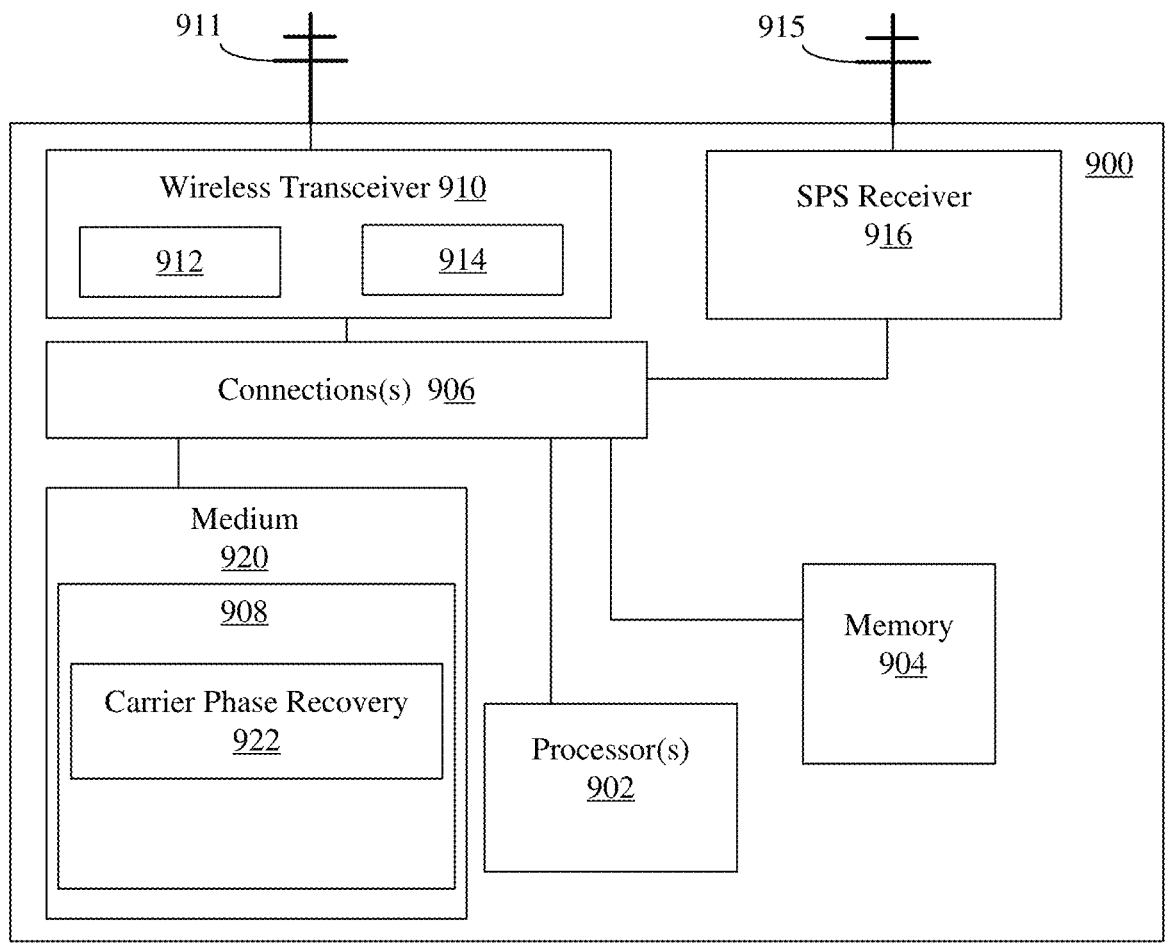
FIG. 9 shows a schematic block diagram illustrating certain exemplary features of a mobile device, enabled to recover carrier phase for one or more positioning signals, according to the disclosure herein.

FIG. 9 shows a schematic block diagram illustrating certain exemplary features of a mobile device 900, e.g., which may be mobile device 105 shown in FIG. 1, enabled to recover carrier phase for one or more positioning signals, according to the disclosure herein. Mobile device 900 may, for example, include one or more processors 902, memory 904, an external interface such as a wireless transceiver 910, and an SPS receiver 916, which may be operatively coupled with one or more connections 906 (e.g., buses, lines, fibers, links, etc.) to non-transitory computer readable medium 920 and memory 904. The mobile device 900 may further include additional items, which are not shown, such as a user interface that may include e.g., a display, a keypad or other input device, such as virtual keypad on the display, through which a user may interface with the mobile device, or a satellite positioning system receiver. In certain example implementations, all, or part of mobile device 900 may take the form of a chipset, and/or the like. Wireless transceiver 910 may, for example, include a transmitter 912 enabled to transmit one or more signals over one or more types of wireless communication networks and a receiver 914 to receive one or more signals transmitted over the one or more types of wireless communication networks, and may be configured for various communication protocols/standards, such as satellite communications, 5G NR, LTE, Wi-Fi, etc. The SPS receiver 916 may receive SPS signals with multiple frequency bands and of various satellite position signaling standards, such as GPS, GLONASS, GAL, BDS, and/or other type of satellite positioning system. The SPS receiver 916 may include a measurement engine and a position engine, or one or more of the measurement engine and position engine may be implemented by the one or more processors 502, e.g., implementing one or more instructions or program code 508 on a non-transitory computer readable medium, such as medium 920 and/or memory 904.

In some embodiments, mobile device 900 may include one or more antennas 911 and 915, which may be internal or external. Antenna 911 may be used to transmit and/or receive signals processed by wireless transceiver 910. In some embodiments, mobile device antenna 911 may be coupled to wireless transceiver 910. In some embodiments, measurements of signals received (transmitted) by mobile device 900 may be performed at the point of connection of the mobile device antenna 911 and wireless transceiver 910. For example, the measurement point of reference for received (transmitted) RF signal measurements may be an input (output) terminal of the receiver 914 (transmitter 912) and an output (input) terminal of the mobile device antenna 911. In a mobile device 900 with multiple mobile device antennas 911 or antenna arrays, the antenna connector may be viewed as a virtual point representing the aggregate output (input) of multiple mobile device antennas. Antenna 915 may be coupled to SPS receiver 916 and may be used to receive SPS signals on multiple frequency bands. In some embodiments, measurements of SPS signals received by mobile device 900 may be performed at the point of connection of the antenna 915 and SPS receiver 916.

The one or more processors 902 may be implemented using a combination of hardware, firmware, and software. For example, the one or more processors 902 may be configured to perform the functions discussed herein by implementing one or more instructions or program code 908 on a non-transitory computer readable medium, such as medium 920 and/or memory 904. In some embodiments, the one or more processors 902 may represent one or more circuits configurable to perform at least a portion of a data signal computing procedure or process related to the operation of mobile device 900.

The medium 920 and/or memory 904 may store instructions or program code 908 that contain executable code or software instructions that when executed by the one or more processors 902 cause the one or more processors 902 to operate as a special purpose computer programmed to perform the techniques disclosed herein. As illustrated in mobile device 900, the medium 920 and/or memory 904 may include one or more components or modules that may be implemented by the one or more processors 902 to perform the methodologies described herein. While the components or modules are illustrated as software in medium 920 that is executable by the one or more processors 902, it should be understood that the components or modules may be stored in memory 904 or may be dedicated hardware either in the one or more processors 902 or off the processors.

A number of software modules and data tables may reside in the medium 920 and/or memory 904 and be utilized by the one or more processors 902 in order to manage both communications and the functionality described herein. It should be appreciated that the organization of the contents of the medium 920 and/or memory 904 as shown in mobile device 900 is merely exemplary, and as such the functionality of the modules and/or data structures may be combined, separated, and/or be structured in different ways depending upon the implementation of the mobile device 900.

The medium 920 and/or memory 904 may include a carrier phase recover module 922 that when implemented by the one or more processors 902 configures the one or more processors 902 to user carrier phase measured for a second positioning signal, received from a first SV, to recover carrier phase of a first positioning signal received from the first SV, as discussed herein.

The methodologies described herein may be implemented by various means depending upon the application. For example, these methodologies may be implemented in hardware, firmware, software, or any combination thereof. For a hardware implementation, the one or more processors 902 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 920 or memory 904 that is connected to and executed by the one or more processors 902. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 908 on a non-transitory computer readable medium, such as medium 920 and/or memory 904. Examples include computer readable media encoded with a data structure and computer readable media encoded with a computer program 908. For example, the non-transitory computer readable medium including program code 908 stored thereon may include program code 908 to support concurrent operation of wireless communications and SPS operation, in a manner consistent with disclosed embodiments. Non-transitory computer readable medium 920 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 508 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 920, instructions and/or data may be provided as signals on transmission media included in a communication apparatus. For example, a communication apparatus may include a wireless transceiver 910 having signals indicative of instructions and data. The instructions and data are configured to cause one or more processors to implement the functions outlined in the claims. That is, the communication apparatus includes transmission media with signals indicative of information to perform disclosed functions.

Memory 904 may represent any data storage mechanism. Memory 904 may include, for example, a primary memory and/or a secondary memory. Primary memory may include, for example, a random access memory, read only memory, etc. While illustrated in this example as being separate from one or more processors 902, it should be understood that all or part of a primary memory may be provided within or otherwise co-located/coupled with the one or more processors 902. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer readable medium 920. As such, in certain example implementations, the methods and/or apparatuses presented herein may take the form in whole or part of a computer readable medium 920 that may include computer implementable code 908 stored thereon, which if executed by one or more processors 902 may be operatively enabled to perform all or portions of the example operations as described herein. Computer readable medium 920 may be a part of memory 904.

Figure 10:
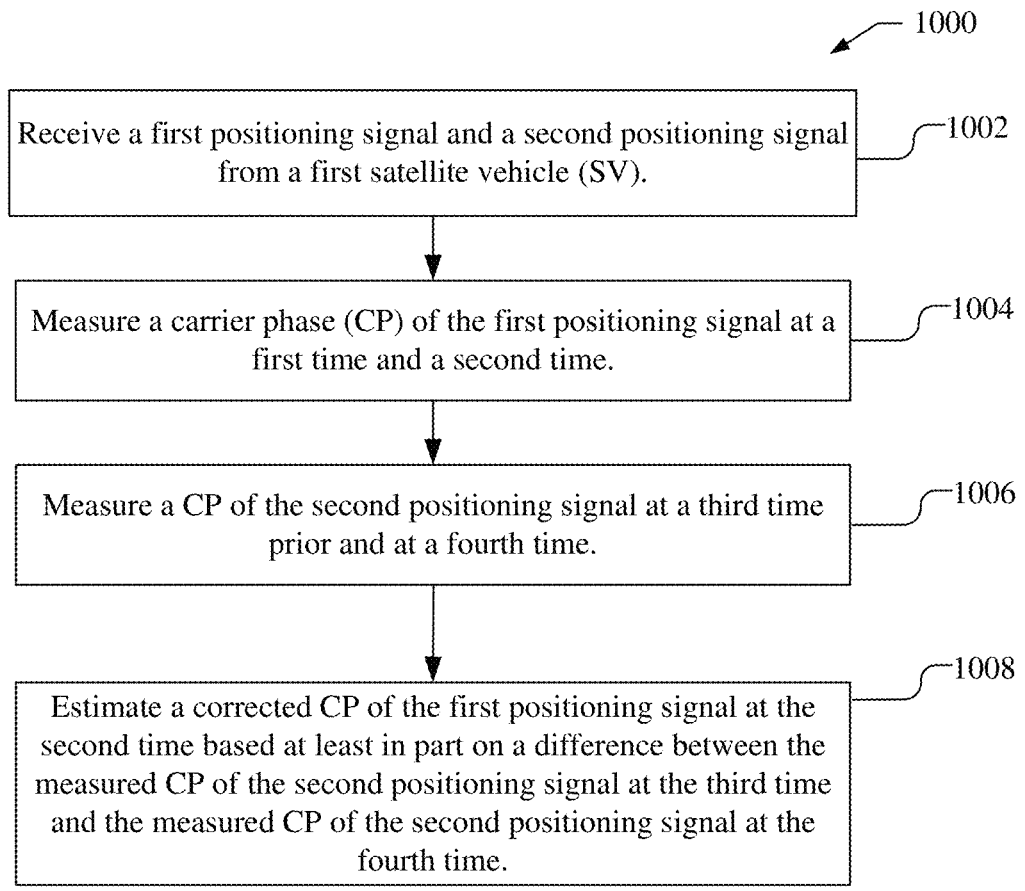
FIG. 10 is a flow chart illustrating a method for supporting satellite positioning system (SPS) operation performed by a mobile device, as described herein.

FIG. 10 is a flow chart illustrating a method 1000 for supporting satellite positioning system (SPS) operation performed by a mobile device, such as mobile device 105 or 900, as described herein.

At block 1002, the mobile device 105 may receive a first positioning signal and a second positioning signal from a first satellite vehicle (SV). For example, the first and second positioning signal may be a GS L1 and GPS L5 signal, or vice versa, a Galileo E1 and Galileo E5 signal, or vice versa, a BDS B1C signal and a BDS B2A signal, or similar. A means for receiving a first positioning signal and a second positioning signal from a first satellite vehicle (SV) may include the SPS receiver 916, including an RFIC module 930 or a modem IC, or a wireless transceiver 910, along with one or more processors 902 with dedicated hardware or implementing executable code or software instructions in memory 904 and/or medium 920.

At block 1004, the mobile device 105 may measure a carrier phase (CP) of the first positioning signal at a first time and at a second time. A means for measuring the CP of the first positioning signal at the first time and the second time may include the may include the SPS receiver 916, including an RFIC module 930 or a modem IC, or a wireless transceiver 910, along with one or more processors 902 with dedicated hardware or implementing executable code or software instructions in memory 904 and/or medium 920 such as the carrier phase recovery module 922.

At block 1006, the mobile device 105 may measure a CP of the second positioning signal at a third time and at a fourth time. In one implementation, the first time is equal to the third time and the second time is equal to the fourth time. A means for measuring a CP of the second positioning signal at a third time and at a fourth time may include the SPS receiver 916, including an RFIC module 930 or a modem IC, or a wireless transceiver 910, along with one or more processors 902 with dedicated hardware or implementing executable code or software instructions in memory 904 and/or medium 920 such as the carrier phase recovery module 922.

At block 1008 the mobile device 105 may estimate a corrected CP of the first positioning signal at the second time based at least in part on a difference between the measured CP of the second positioning signal at the third time and the measured CP of the second positioning signal at the fourth time. In one example, estimating the corrected CP of the first positioning signal includes selecting a fractional value of the corrected CP to be a fractional value of the measured CP of the first positioning signal at the second time and selecting an integer value of the corrected CP based at least in part on the difference between the measured CP of the second positioning signal at the third time and at the fourth time, In some aspects, selecting the integer value of the corrected CP is based at least in part on a linear projection of the measured CP of the second positioning signal at the third time and the fourth time. In some aspects, the first positioning signal is a data-modulated GNSS signal and estimating the corrected CP of the first positioning signal at the second time includes resolving a half cycle ambiguity in the data-modulated GNSS signal after a loss of lock. A means for estimating a corrected CP of the first positioning signal at the second time based at least in part on a difference between the measured CP of the second positioning signal at the third time and the measured CP of the second positioning signal at the third time may include the SPS receiver 916, including an RFIC module 930 or a modem IC, or a wireless transceiver 910, along with one or more processors 902 with dedicated hardware or implementing executable code or software instructions in memory 904 and/or medium 920 such as the carrier phase recovery module 922.

In some aspects, estimating the corrected CP is in response to detecting a cycle slip in the CP of the first positioning signal after the first time and prior to the second time. In another aspect, estimating the corrected CP is in response to determining that one or more circuits for receiving the first positioning signal were in a low power state between the first time and the second time. In another aspect, estimating the corrected CP is in response to determining a presence of interference with reception of the first positioning signal between the first time and the second time. In one example, the first positioning signal is a Galileo E1 signal, and determining a presence of interference may include determining that transmission or reception of one or more signals in the B13 or B14 bands by the mobile device 105 interferes with reception of the Galileo E1 signal. In one example, the first positioning signal is a BDS B1C signal, and determining a presence of interference may include determining that transmission or reception of one or more signals in the B13 or B14 bands by the mobile device 105 interferes with reception of the BDS B1C signal. In another example, the first positioning signal is a GPS L1 signal, and determining the presence of interference with reception of the first positioning signal includes determining that another satellite signal interferes with reception of the GPS L5 signal.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

A satellite-based positioning system typically includes a system of transmitters positioned to enable entities to determine their position on or above the Earth based, at least in part, on signals received from the transmitters. Such a transmitter typically transmits a signal marked with a repeating pseudo-random noise (PN) code. In a particular example, such transmitters may be located on Earth orbiting space vehicles (SV). For example, an SV in a constellation of Global Navigation Satellite System (GNSS) such as Global Positioning System GPS, Global Navigation Satellite System (GLONASS), etc. may transmit a signal marked with a PN code that is distinguishable from PN codes transmitted by other SVs in the constellation.

In accordance with certain aspects, the techniques presented herein are not restricted to global systems (e.g., GNSS). For example, the techniques provided herein may be applied to or otherwise adapted for use in various regional systems, such as, e.g., Quasi-Zenith Satellite System (QZSS) over Japan, Indian Regional Navigational Satellite System (IRNSS) over India, etc., and/or various augmentation systems (e.g., a Satellite Based Augmentation System (SBAS)) that may be associated with or otherwise adapted for use with one or more global and/or regional navigation satellite systems. By way of example but not limitation, an SBAS may include an augmentation system(s) that provide integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Such SBAS may, for example, transmit GNSS and/or GNSS-like signals that may also be interfered with by certain wireless communication signals, etc. Thus, as used herein, an SPS may include any combination of one or more global and/or regional navigation satellite systems and/or augmentation systems.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

Implementation examples are described in the following numbered clauses:

1. A method for supporting satellite positioning system (SPS) operation performed by a mobile device, the method comprising:
   receiving a first positioning signal from a first satellite vehicle (SV);
   receiving a second positioning signal from the first SV;
   measuring a carrier phase (CP) of the first positioning signal at a first time and at a second time;
   measuring a CP of the second positioning signal at a third time and at a fourth time; and
   estimating a corrected CP of the first positioning signal at the second time based at least in part on a difference between the measured CP of the second positioning signal at the third time and the measured CP of the second positioning signal at the fourth time.

2. The method of clause 1, wherein estimating the corrected CP of the first positioning signal comprises selecting a fractional value of the corrected CP to be a fractional value of the measured CP of the first positioning signal at the second time and selecting an integer value of the corrected CP based at least in part on a difference between the measured CP of the second positioning signal at the third time and at the fourth time.

3. The method of clause 2, wherein selecting the integer value of the corrected CP is based at least in part on a projection of the measured CP of the second positioning signal at the third time and the fourth time.

4. The method of any of clauses 1-3, wherein the first time is equal to the third time and the second time is equal to the fourth time.

5. The method of any of clauses 1-4, wherein the corrected CP is estimated in response to detecting a cycle slip in the CP of the first positioning signal between the first time and the second time.

6. The method of any of clauses 1-5, wherein the corrected CP is estimated in response to determining that one or more circuits for receiving the first positioning signal were in a low power state between the first time and the second time.

7. The method of any of clauses 1-6, wherein the corrected CP is estimated in response to determining a presence of interference with reception of the first positioning signal between the first time and the second time.

8. The method of clause 7, wherein the first positioning signal is a Galileo E1 signal, and wherein determining the presence of interference with reception of the first positioning signal comprises determining that transmission or reception of one or more signals in the B13 or B14 bands by the mobile device interferes with reception of the Galileo E1 signal between the first time and the second time.

9. The method of clause 7, wherein the first positioning signal is a GPS L1 signal, and wherein determining the presence of interference with reception of the first positioning signal comprises determining that another satellite signal interferes with reception of the GPS L1 signal between the first time and the second time.

10. The method of any of clauses 1-7, wherein the first positioning signal is a data-modulated global navigation satellite system (GNSS) signal, and wherein estimating the corrected CP of the first positioning signal at the second time comprises resolving a half cycle ambiguity in the data-modulated GNSS signal after a loss of lock.

11. The method of any of clauses 1-7, wherein the first positioning signal is a GPS L1 signal and wherein the second positioning signal is a GPS L5 signal.

12. The method of any of clauses 1-7, wherein the first positioning signal is a GPS L5 signal and wherein the second positioning signal is a GPS L1 signal.

13. The method of any of clauses 1-7, wherein the first positioning signal is a Galileo E1 signal, and wherein the second positioning signal is a Galileo E5 signal.

14. The method of any of clauses 1-7, wherein the first positioning signal is a Galileo E5 signal, and wherein the second positioning signal is a Galileo E1 signal.

15. A mobile device configured to support satellite positioning system (SPS) operation, the mobile device comprising:
   a satellite positioning system (SPS) receiver configured to receive SPS signals over a plurality of frequency bands;
   a processor coupled to the SPS receiver and configured to:
      receive a first positioning signal from a first satellite vehicle (SV);
      receive a second positioning signal from the first SV;
      measure a carrier phase (CP) of the first positioning signal at a first time and at a second time;

measure a CP of the second positioning signal at a third time and at a fourth time; and estimate a corrected CP of the first positioning signal at the second time based at least in part on a difference between the measured CP of the second positioning signal at the third time and the measured CP of the second positioning signal at the fourth time.

16. The mobile device of clause 15, wherein the controller is configured to estimate the corrected CP of the first positioning signal by selecting a fractional value of the corrected CP to be a fractional value of the measured CP of the first positioning signal at the second time and selecting an integer value of the corrected CP based at least in part on a difference between the measured CP of the second positioning signal at the third time and at the fourth time.

17. The mobile device of clause 16, wherein the controller is configured to select the integer value of the corrected CP based at least in part on a projection of the measured CP of the second positioning signal at the third time and at the fourth time.

18. The mobile device of any of clauses 15-17, wherein the first time is equal to the third time and the second time is equal to the fourth time.

19. The mobile device of any of clauses 15-18, wherein the controller is configured to determine that the measurement of the CP of the first positioning signal is not continuous by detecting a cycle slip in the CP of the first positioning signal between the first time and the second time.

20. The mobile device of any of clauses 15-19, wherein the controller is configured to determine that the measurement of the CP of the first positioning signal is not continuous by determining that one or more circuits for receiving the first positioning signal were in a low power state between the first time and the second time.

21. The mobile device of any of clauses 15-20, wherein the controller is configured to determine that the measurement of the CP of the first positioning signal is not continuous by determining a presence of interference with reception of the first positioning signal between the first time and the second time.

22. The mobile device of clause 21, wherein the first positioning signal is a Galileo E1 signal, and wherein the controller is configured to determine the presence of interference with reception of the first positioning signal by determining that transmission or reception of one or more signals in the B13 or B14 bands by the mobile device interferes with reception of the Galileo E1 signal between the first time and the second time.

23. The mobile device of clause 21, wherein the first positioning signal is a GPS L5 signal, and wherein the controller is configured to determine the presence of interference with reception of the first positioning signal by determining that another satellite signal interferes with reception of the GPS L5 signal between the first time and the second time.

24. The mobile device of any of clauses 15-20, wherein the first positioning signal is a data-modulated global navigation satellite system (GNSS) signal, and wherein the controller is configured to estimate the corrected CP of the first positioning signal at the second time by resolving a half cycle ambiguity in the data-modulated GNSS signal after a loss of lock.

25. The mobile device of any of clauses 15-20, wherein the first positioning signal is a GPS L5 signal and wherein the second positioning signal is a GPS L5 signal.

26. The mobile device of any of clauses 15-20, wherein the first positioning signal is a GPS L5 signal and wherein the second positioning signal is a GPS L1 signal.

27. The mobile device of any of clauses 15-20, wherein the first positioning signal is a Galileo E1 signal, and wherein the second positioning signal is a Galileo E5 signal.

28. A mobile device configured to support satellite positioning system (SPS) operation, the mobile device comprising:

means for receiving a first positioning signal from a first satellite vehicle (SV);

means for receiving a second positioning signal from the first SV;

means for measuring a carrier phase (CP) of the first positioning signal at a first time and at a second time;

means for measuring a CP of the second positioning signal at a third time and at a fourth time; and means for estimating a corrected CP of the first positioning signal at the second time based at least in part on a difference between the measured CP of the second positioning signal at the third time and the measured CP of the second positioning signal at the fourth time.

29. The mobile device of clause 28, wherein the means for estimating the corrected CP of the first positioning signal is configured to select a fractional value of the corrected CP to be a fractional value of the measured CP of the first positioning signal at the second time and select an integer value of the corrected CP based at least in part on a difference between the measured CP of the second positioning signal at the third time and at the fourth time.

30. A non-transitory storage medium including program code stored thereon, the program code is operable to configure at least one processor in a mobile device to support satellite positioning system (SPS) operation, comprising:

program code to receive a first positioning signal from a first satellite vehicle (SV);

program code to receive a second positioning signal from the first SV;

program code to measure a carrier phase (CP) of the first positioning signal at a first time and at a second time;

program code to measure a CP of the second positioning signal at a third time and at a fourth time; and program code to estimate a corrected CP of the first positioning signal at the second time based at least in part on a difference between the measured CP of the second positioning signal at the third time and the measured CP of the second positioning signal at the fourth time.

What is claimed is:

1. A method for supporting satellite positioning system (SPS) operation performed by a mobile device, the method comprising:

receiving a first positioning signal from a satellite vehicle (SV);

receiving a second positioning signal from the same SV as the first positioning signal;

measuring a first carrier phase (CP) measurement of the first positioning signal at a first time and a second CP measurement of the first positioning signal at a second time;

performing a third CP measurement of the second positioning signal at a third time and a fourth CP measurement of the second positioning signal at a fourth time; and estimating a corrected second CP measurement of the first positioning signal by selecting an integer value of the corrected second CP measurement using a difference between the third CP measurement and the fourth CP measurement of the second positioning signal and selecting a fractional value of the second CP measurement to be a fractional value of the corrected second CP measurement.

2. The method of claim 1, wherein selecting the integer value of the corrected second CP measurement is based at least in part on a projection of the third CP measurement and the fourth CP measurement of the second positioning signal at the third time and the fourth time.

3. The method of claim 1, wherein the first time is equal to the third time and the second time is equal to the fourth time.

4. The method of claim 1, wherein the corrected second CP measurement is estimated in response to detecting a cycle slip in the CP of the first positioning signal between the first time and the second time.

5. The method of claim 1, wherein the corrected second CP measurement is estimated in response to determining that one or more circuits for receiving the first positioning signal were in a low power state between the first time and the second time.

6. The method of claim 1, wherein the corrected second CP measurement is estimated in response to determining a presence of interference with reception of the first positioning signal between the first time and the second time.

7. The method of claim 6, wherein the first positioning signal is a Galileo E1 signal, and wherein determining the presence of interference with reception of the first positioning signal comprises determining that cellular transmission or reception of one or more signals in B13 or B14 bands by the mobile device interferes with reception of the Galileo E1 signal between the first time and the second time.

8. The method of claim 6, wherein the first positioning signal is a GPS L1 signal, and wherein determining the presence of interference with reception of the first positioning signal comprises determining that another satellite signal interferes with reception of the GPS L1 signal between the first time and the second time.

9. The method of claim 1, wherein the first positioning signal is a data-modulated global navigation satellite system (GNSS) signal, and wherein estimating the corrected second CP measurement of the first positioning signal at the second time comprises resolving a half cycle ambiguity in the data-modulated GNSS signal after a loss of lock.

10. The method of claim 1, wherein the first positioning signal is a GPS L1 signal and wherein the second positioning signal is a GPS L5 signal.

11. The method of claim 1, wherein the first positioning signal is a GPS L5 signal and wherein the second positioning signal is a GPS L1 signal.

12. The method of claim 1, wherein the first positioning signal is a Galileo E1 signal, and wherein the second positioning signal is a Galileo E5 signal.

13. The method of claim 1, wherein the first positioning signal is a Galileo E5 signal, and wherein the second positioning signal is a Galileo E1 signal.

14. A mobile device configured to support satellite positioning system (SPS) operation, the mobile device comprising:
a satellite positioning system (SPS) receiver configured to receive SPS signals over a plurality of frequency bands;
a processor coupled to the SPS receiver and configured to:
receive a first positioning signal from a satellite vehicle (SV);
receive a second positioning signal from the same SV as the first positioning signal;
measure a first carrier phase (CP) measurement of the first positioning signal at a first time and a second CP measurement of the first positioning signal at a second time;
perform a third CP measurement of the second positioning signal at a third time and a fourth CP measurement of the second positioning signal at a fourth time; and
estimate a corrected second CP measurement of the first positioning signal by selecting an integer value of the corrected second CP measurement using a difference between the third CP measurement and the fourth CP measurement of the second positioning signal and selecting a fractional value of the second CP measurement to be a fractional value of the corrected second CP measurement.

15. The mobile device of claim 14, wherein the processor is configured to select the integer value of the corrected second CP measurement is based at least in part on a projection of the third CP measurement and the fourth CP measurement of the second positioning signal at the third time and the fourth time.

16. The mobile device of claim 14, wherein the first time is equal to the third time and the second time is equal to the fourth time.

17. The mobile device of claim 14, wherein the processor is configured to estimate the corrected second CP measurement in response to detecting a cycle slip in the CP of the first positioning signal between the first time and the second time.

18. The mobile device of claim 14, wherein the processor is configured to estimate the corrected second CP measurement in response to determining that one or more circuits for receiving the first positioning signal were in a low power state between the first time and the second time.

19. The mobile device of claim 14, wherein the processor is configured to estimate the corrected second CP measurement in response to determining a presence of interference with reception of the first positioning signal between the first time and the second time.

20. The mobile device of claim 19, wherein the first positioning signal is a Galileo E1 signal, and wherein the processor is configured to determine the presence of interference with reception of the first positioning signal by determining that cellular transmission or reception of one or more signals in B13 or B14 frequency bands by the mobile device interferes with reception of the Galileo E1 signal between the first time and the second time.

21. The mobile device of claim 19, wherein the first positioning signal is a GPS L1 signal, and wherein the processor is configured to determine the presence of interference with reception of the first positioning signal by determining that another satellite signal interferes with reception of the GPS L1 signal between the first time and the second time.

22. The mobile device of claim 14, wherein the first positioning signal is a data-modulated global navigation satellite system (GNSS) signal, and wherein the processor is configured to estimate the corrected CP of the first positioning signal at the second time by resolving a half cycle ambiguity in the data-modulated GNSS signal after a loss of lock.

23. The mobile device of claim 14, wherein the first positioning signal is a GPS L1 signal and wherein the second positioning signal is a GPS L5 signal.

24. The mobile device of claim 14, wherein the first positioning signal is a GPS L5 signal and wherein the second positioning signal is a GPS L1 signal.

25. The mobile device of claim 14, wherein the first positioning signal is a Galileo E1 signal, and wherein the second positioning signal is a Galileo E5 signal.

26. A mobile device configured to support satellite positioning system (SPS) operation, the mobile device comprising:
- means for receiving a first positioning signal from a satellite vehicle (SV);
- means for receiving a second positioning signal from the same SV as the first positioning signal;
- means for measuring a first carrier phase (CP) measurement of the first positioning signal at a first time and a second CP measurement of the second positioning signal at a second time;
- means for performing a third CP measurement of the second positioning signal at a third time and a fourth CP measurement of the first positioning signal at a fourth time; and
- means for estimating a corrected second CP measurement of the first positioning signal by selecting an integer value of the corrected second CP measurement using a difference between the third CP measurement and the fourth CP measurement of the second positioning signal and selecting a fractional value of the second CP measurement to be a fractional value of the corrected second CP measurement.

27. A non-transitory storage medium including program code stored thereon, the program code is operable to configure at least one processor in a mobile device to support satellite positioning system (SPS) operation, comprising:
- program code to receive a first positioning signal from a satellite vehicle (SV);
- program code to receive a second positioning signal from the same SV as the first positioning signal;
- program code to measure a first carrier phase (CP) measurement of the first positioning signal at a first time and a second CP measurement of the first positioning signal at a second time;
- program code to perform a third CP measurement of the second positioning signal at a third time and a fourth CP measurement of the second positioning signal at a fourth time; and
- program code to estimate a corrected second CP measurement of the first positioning signal by selecting an integer value of the corrected second CP measurement using a difference between the third CP measurement and the fourth CP measurement of the second positioning signal and selecting a fractional value of the second CP measurement to be a fractional value of the corrected second CP measurement.

* * * * *